United States Patent
Zhu et al.

(10) Patent No.: US 12,192,556 B2
(45) Date of Patent: Jan. 7, 2025

(54) CONTENT CACHING METHOD FOR SATELLITE TERRESTRIAL INTEGRATED NETWORK WITH DIFFERENTIATED INTEREST AND ACCESS MODE

(71) Applicant: ZHEJIANG LAB, Zhejiang (CN)

(72) Inventors: Xiangming Zhu, Hangzhou (CN); Shanyun Liu, Hangzhou (CN); Nan Hao, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/592,565

(22) Filed: Mar. 1, 2024

(65) Prior Publication Data

US 2024/0305849 A1     Sep. 12, 2024

Related U.S. Application Data

(63) Continuation of application No. PCT/CN2023/080452, filed on Mar. 9, 2023.

(51) Int. Cl.
*H04N 21/2665* (2011.01)
*H04N 21/2183* (2011.01)

(52) U.S. Cl.
CPC ..... *H04N 21/2665* (2013.01); *H04N 21/2183* (2013.01)

(58) Field of Classification Search
CPC .............. H04N 21/2665; H04N 21/2183
See application file for complete search history.

(56) References Cited

U.S. PATENT DOCUMENTS

2020/0007226 A1    1/2020    Takagi et al.

FOREIGN PATENT DOCUMENTS

| CN | 109194763 B | * | 5/2020 | ............ H04L 67/06 |
|----|-------------|---|--------|------------------------|
| CN | 112702443 A |   | 4/2021 |                        |
| CN | 113365309 A | * | 9/2021 | ........... H04L 67/568 |
| CN | 113472420 A |   | 10/2021 |                       |
| CN | 113691598 A | * | 11/2021 | ......... H04L 67/5682 |
| CN | 113709775 A |   | 11/2021 |                       |
| CN | 113992753 A | * | 1/2022 | .......... G06F 18/2411 |
| CN | 114759970 A |   | 7/2022 |                        |
| CN | 114827152 A |   | 7/2022 |                        |
| CN | 115587266 A | * | 1/2023 | ......... G06F 16/9574 |

OTHER PUBLICATIONS

International Search Report (PCT/CN2023/080452); Date of Mailing: Nov. 22, 2023.

* cited by examiner

*Primary Examiner* — Jefferey F Harold
*Assistant Examiner* — Alexander Boyd
(74) *Attorney, Agent, or Firm* — W&G Law Group

(57) ABSTRACT

A content caching method for a satellite terrestrial integrated network with differentiated interests and access modes, including: collecting user proportion information, content popularity distribution information, cache capacity information, and link delay information in the satellite terrestrial integrated network; determining a content caching problem of the collaboration of base stations and a satellite for a delay optimization based on differentiated user interests and differentiated access modes; solving the content caching problem to obtain a content caching strategy of the collaboration of the base stations and the satellite; and based on the obtained content caching strategy, caching contents in the base stations and the satellite to provide a content service for base station access users and satellite access users in the satellite terrestrial integrated network.

4 Claims, 9 Drawing Sheets

For each region, fixedly cached contents and selectively cached contents of the base stations in the region are calculated based on local content popularity distribution information, the cache capacity information and the link delay information in the region. In addition, fixedly cached contents and selectively cached contents of the satellite are calculated based on the user proportion information, global content popularity distribution information, and the cache capacity information ⎯ S321

For each region, a solution space of the content caching strategy of the base stations in the region is reduced to a union set of the fixedly cached contents and the selectively cached contents of the base stations in the region, and a search space of the content caching strategy of the base stations in the region is reduced to a set of the selectively cached contents of the base stations in the region. In addition, a solution space of the content caching strategy of the satellite is reduced to a union set of the fixedly cached contents and the selectively cached contents of the satellite, and a search space of the content caching strategy of the satellite is reduced to a set of the selectively cached contents of the satellite ⎯ S322

FIG. 6

CONTENT CACHING METHOD FOR SATELLITE TERRESTRIAL INTEGRATED NETWORK WITH DIFFERENTIATED INTEREST AND ACCESS MODE

CROSS-REFERENCE TO RELATED APPLICATIONS

The present application is a continuation of International Application No. PCT/CN2023/080452, filed on Mar. 9, 2023, the contents of which is incorporated herein by reference in their entireties.

TECHNICAL FIELD

The present disclosure relates to the field of resource allocation in wireless communication, and in particular, to a content caching method for satellite terrestrial integrated network with differentiated interests and access modes.

BACKGROUND

With the development of intelligent devices and multimedia technology, mobile data traffic is increasing in modern society. Due to economic costs and geographical constraints, the construction of traditional ground communication networks in remote areas is still at a relatively low level, and it is further challenging to cover environments such as maritime and airspace. A satellite terrestrial integrated network can compensate for the shortcomings of traditional ground communication networks and provide global coverage for communication services at a lower cost, which is an important development direction for the next generation of communication networks. However, due to the long transmission distance of satellite terrestrial links, users requesting content services from a cloud through satellites may experience longer communication delays, which reduces user experience and limits support for various delay sensitive services.

Edge storage technology has received widespread attention to reduce content service delay in communication networks. Due to the high repeatability of multimedia content, caching contents frequently requested by users at network edge nodes can avoid repetitive retrieval of content from the cloud, thus reducing content service delay. Applying the edge storage technology to the satellite terrestrial integrated network can provide lower delay mobile high-definition videos, virtual reality, augmented reality and other applications for users across a wide area, which can further provide edge data storage and intelligent analysis for various Internet of Thing (IoT) devices such as health monitors and monitoring sensors. Considering the limitation of cache size, a caching strategy of edge nodes typically needs to be designed based on the distribution of user interests to improve cache hit rates and minimize service delay in response to users request content.

Possible cache locations in the satellite terrestrial integrated communication system include base stations, satellites, and ground stations. As both base stations and satellites can provide access services for users, different content service paths need to be constructed for users with different access modes. Meanwhile, due to the wide coverage of satellites, users in different regions have different interest distributions for the same content. Existing caching methods for the satellite terrestrial integrated network usually consider base station access users or satellite access users separately, and usually only consider a global interest model.

There is still a lack of effective methods for a content caching problem under differentiated interests and access modes. To fully exploit the performance of satellite terrestrial integrated network systems, it is necessary to design content caching strategies and optimize user content service delay based on the characteristics of the differentiated interests and access mode.

SUMMARY

An object of the present disclosure is to provide a content caching method for a satellite terrestrial integrated network with differentiated interests and access modes, which can reduce content service delays of base station access users and satellite access users under differentiated user interest distribution, alleviating a problem of long communication delay caused by a long transmission distance of a satellite terrestrial link, and improving user experience to support various delay sensitive services.

To achieve the above object, the present disclosure provides the following technical solutions:

A content caching method for a satellite terrestrial integrated network with differentiated interests and access modes, including:

step (1), collecting user proportion information, content popularity distribution information, cache capacity information, and link delay information in the satellite terrestrial integrated network, where the satellite terrestrial integrated network includes base stations, a satellite, base station access users, satellite access users, a ground station, and a cloud server; and a cover area of the satellite terrestrial integrated network is divided into multiple regions, and different regions have different local content popularity distributions;

step (2), determining a content caching problem of a collaboration of the base stations and the satellite for a delay optimization based on differentiated user interests and differentiated access modes, where the delay optimization refers to minimizing an average content retrieval delay of all users in the satellite terrestrial integrated network; and the step (2) includes:

sub-step (2.1), for each region covered by the satellite terrestrial integrated network, calculating, based on a local content popularity distribution in the region, content storage probabilities of the requested content in the base stations, the satellite, the ground station, and the cloud server when the base station access users in the region request any content; and for each region covered by the satellite terrestrial integrated network, calculating, based on the local content popularity distribution in the region, content storage probabilities of the requested content in the satellite, the ground station, and the cloud server when the satellite access users in the region request any content;

sub-step (2.2), for each region covered by the satellite terrestrial integrated network, calculating the average content retrieval delay of the base station access users and the average content retrieval delay of the satellite access user, respectively, based on the content storage probabilities and the link delay information;

sub-step (2.3), performing weighted summation on the average content retrieval delays of all users in all regions within a coverage area of the satellite terrestrial integrated network to obtain a network average content retrieval delay; and sub-step (2.4), obtaining the content caching problem by taking a content caching strategy of the collaboration of the base stations and the satellite as an optimization variable, minimization of the network average content retrieval delay as an optimization target, and cache capacities of the base stations and the satellite as an optimization limitation condition;

step (3), solving the content caching problem to obtain the content caching strategy of the collaboration of the base stations and the satellite;

sub-step (3.1), equivalently converting the average content retrieval delay of the satellite access users in different regions into the average content retrieval delay of all the satellite access users under a global content popularity distribution, to reduce a calculation complexity of the average content retrieval delay of the satellite access users;

sub-step (3.2), reducing a solution space size and reducing a search complexity of the content caching strategy based on solution space analysis;

sub-step (3.3), converting the content caching problem into a maximization problem of a delay reduction gain, where the delay reduction gain refers to a reduction amount of the average content retrieval delay of the user under a current content caching strategy when no content is cached by the base stations and the satellite; and sub-step (3.4), solving the converted maximization problem of the delay reduction gain to obtain the content caching strategy of the collaboration of the base stations and the satellite; and step (4), caching, based on the obtained content caching strategy, contents in the base stations and the satellite to provide a content service for the base station access users and the satellite access users in the satellite terrestrial integrated network.

Further, there is a communication link between the base stations and the base station access users in the coverage area, there is a communication link between the satellite and the base stations in the coverage area, there is a communication link between the satellite and the satellite access users in the coverage area, there is a communication link between the ground station and the satellite, and there is a communication link between the cloud server and the ground station in the step (1); the base stations, the satellite and the ground station cache part of contents possibly requested by users, while the cloud server stores all contents possibly requested by users; and the base stations is capable of transmitting cached contents to the base station access users in the coverage area, the satellite is capable of transmitting the cached contents to the base stations and the satellite access users in the coverage area, the ground station is capable of transmitting the cached contents to the satellite, and the cloud server is capable of transmitting contents stored at a cloud to the ground station.

Further, the user proportion information is proportion information of the base station access users and the satellite access users in the satellite terrestrial integrated network, and proportion information of users in different regions covered by the satellite terrestrial integrated network in the step (1);

the content popularity distribution information is local content popularity distribution information of different regions covered by the satellite terrestrial integrated network;

the cache capacity information includes base station cache capacity information and satellite cache capacity information; and the link delay information includes link delay information from the base stations to the base station access users, link delay information from the satellite to the base stations, link delay information from the satellite to the satellite access user, link delay information from the ground station to the satellite, and link delay information from the cloud server to the ground station.

Further, the sub-step (3.2) further includes:

sub-step (3.2.1), for each region, calculating fixedly cached contents and selectively cached contents of the base stations in the region based on the local content popularity distribution information, the cache capacity information and the link delay information of the region, where the fixedly cached contents refer to contents necessarily cached in the content caching strategy obtained by solving the content caching problem, and the selectively cached contents refer to contents possibly cached in the content caching strategy obtained by solving the content caching problem; and calculating fixedly cached contents and selectively cached contents of the satellite based on the user proportion information, global content popularity distribution information, and the cache capacity information; and sub-step (3.2.2), for each region, reducing a solution space of the content caching strategy of the base stations in the region to a union set of the fixedly cached contents and the selectively cached contents of the base stations in the region, and reducing a search space of the content caching strategy of the base stations in the region to a set of the selectively cached contents of the base stations in the region; and reducing a solution space of the content caching strategy of the satellite to a union set of the fixedly cached contents and the selectively cached contents of the satellite, and reducing a search space of the content caching strategy of the satellite to a set of the selectively cached contents of the satellite.

Further, the sub-step (3.4) includes the following iterative sub-steps:

sub-step (3.4.1), initializing a satellite iterative solution into a set of the fixedly cached contents of the satellite;

sub-step (3.4.2), initializing all contents in the set of the selectively cached contents of the satellite to be in an unselected state;

sub-step (3.4.3), selecting unselected content from the set of the selectively cached contents of the satellite, and updating a satellite candidate solution corresponding to the unselected content into a union of the satellite iterative solution and the selected content;

sub-step (3.4.4), calculating, for each region, a content caching strategy when the base stations obtain a maximum delay reduction gain under the satellite candidate solution corresponding to the selected content;

sub-step (3.4.5), calculating a corresponding delay reduction gain based on the satellite candidate solution corresponding to the selected content and the calculated content caching strategy of the base stations;

sub-step (3.4.6), determining whether there is unselected content in the set of the selectively cached contents of the satellite; when there is unselected content in the set of the selectively cached contents of the satellite, returning to the sub-step (3.4.3); and when there is no unselected content in the set of the selectively cached contents of the satellite, comparing satellite candidate solutions corresponding to all contents in the set of the selectively cached contents of the satellite, and updating the satellite iterative solution to a satellite candidate solution with the maximum delay reduction gain;

sub-step (3.4.7), determining whether the satellite iterative solution reaches an upper limit of the cache capacity of the satellite when there is no unselected content in the set of the selectively cached contents of the satellite; when the satellite iterative solution does not reach the upper limit of the cache capacity of the satellite, returning to the sub-step (3.4.2); when the satellite iterative solution has reached the upper limit of the cache capacity of the satellite, ending the iterative sub-steps; and sub-step (3.4.8), the solved content caching strategy of the satellite being the satellite iterative solution; for each region, the solved content caching strategy of the base stations being the content caching strategy of the base stations calculated in the sub-step (3.4.4) corresponding to the satellite iterative solution.

Further, the sub-step (3.4.4) further includes:

sub-step (3.4.4.1), for each region, initializing the content caching strategy of the base stations in the region to a set of the fixedly cached contents of the base stations in the region;

sub-step (3.4.4.2), for each region, calculating, for each content in the set of the selectively cached contents of the base stations in the region, a delay reduction amount for the base station access users in the region to retrieve the content when the content caching strategy of the satellite is a given satellite candidate solution in a case where the base stations cache the content as compared with a case where the base stations do not; and sub-step (3.4.4.3), for each region, sorting the calculated delay reduction amounts for all contents in the set of the selectively cached contents of the base stations in the region, and adding the content with a maximum delay reduction amount into the base stations in the region to be cached until a number of the cached contents of the base stations in the region reaches an upper limit of the cache capacity of the base stations.

An electronic device, including:

one or more processors; and a storage apparatus configured to store one or more programs, where the one or more programs, when executed by the electronic device, is configured to enable the electronic device to implement the content caching method for a satellite terrestrial integrated network with differentiated interests and access modes.

A computer-readable storage medium on which a program is stored, where the program, when executed by a processor, is configured to implement the content caching method for a satellite terrestrial integrated network with differentiated interests and access modes.

Compared with the prior art, the present disclosure has the following beneficial effects:

The method provided by the present disclosure includes the following steps: firstly, collecting user proportion information, content popularity distribution information, cache capacity information, and link delay information in the satellite terrestrial integrated network; then, determining a content caching problem of the collaboration of base stations and a satellite for a delay optimization based on differentiated user interests and differentiated access modes, and solving the content caching problem to obtain a content caching strategy of the collaboration of the base stations and a satellite; and finally, caching, based on the obtained content caching strategy, contents in the base stations and the satellite to provide a content service for the base station access users and the satellite access users in the satellite terrestrial integrated network to optimize content service capability of the satellite terrestrial integrated network. The method can reduce content service delays of base station access users and satellite access users under differentiated user interest distribution, alleviating a problem of long communication delay caused by a long transmission distance of a satellite terrestrial link, and improving user experience to support various delay sensitive services.

BRIEF DESCRIPTION OF DRAWINGS

FIG. 6 shows a flowchart for reducing a solution space size and reducing search complexity of the content caching strategy based on solution space analysis according to an embodiment of the present disclosure.

DESCRIPTION OF EMBODIMENTS

In order to make the objects, technical solutions and advantages of the present disclosure clearer, the present disclosure will be further described in detail below with reference to the drawings and embodiments. However, it should be understood that the specific embodiments described herein are only intended to explain the present disclosure and are not intended to limit the scope of the present disclosure. Furthermore, descriptions of well-known structures and techniques are omitted in the following description to avoid unnecessarily obscuring the concepts of the present disclosure.

Figure 1:
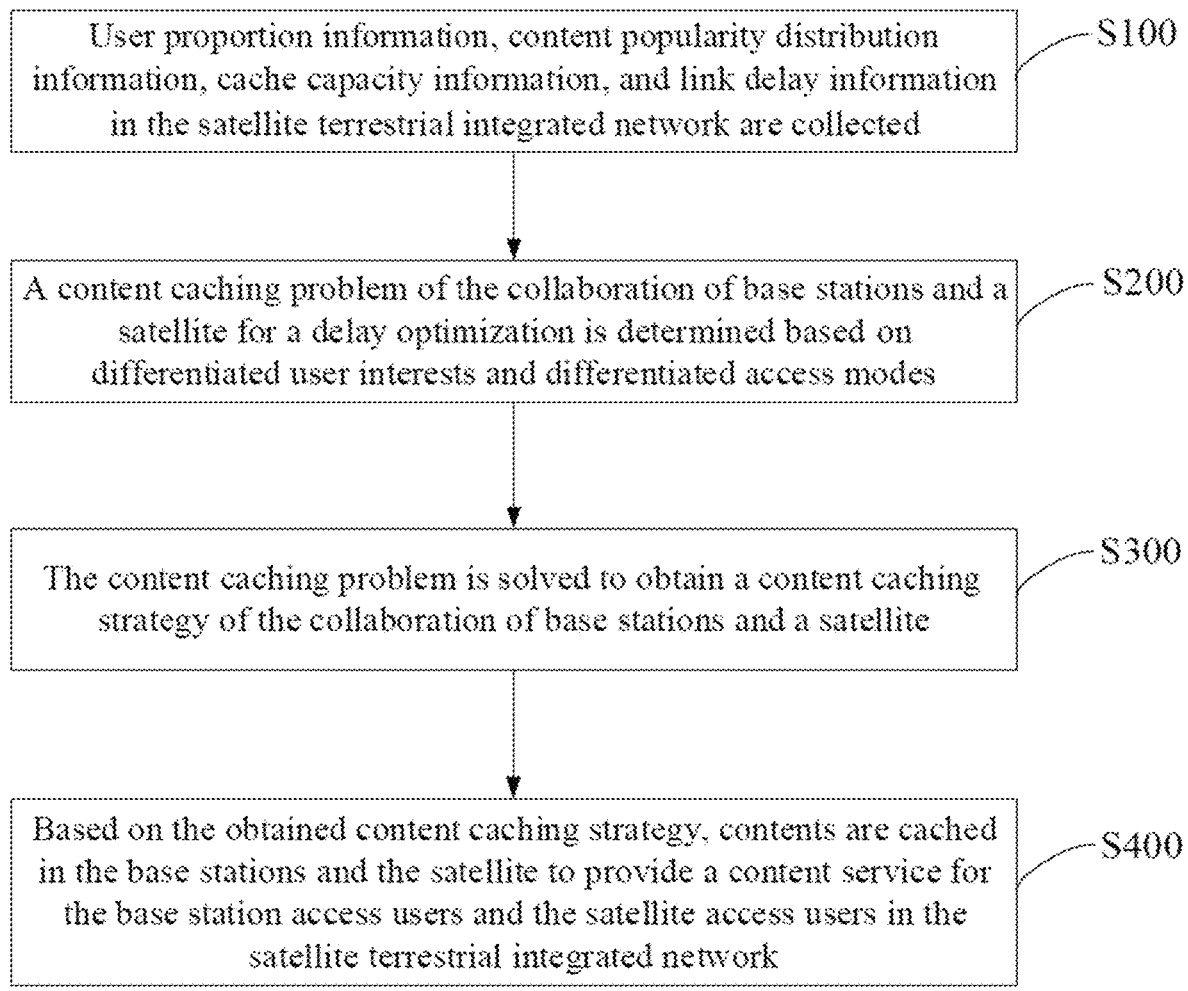
FIG. 1 is a flowchart of a content caching method for a satellite terrestrial integrated network with differentiated interests and access modes according to an embodiment of the present disclosure.

Existing content caching methods for a satellite terrestrial integrated network usually consider base station access users or satellite access users separately, and usually only consider a global interest model, which has a poor performance for a content caching problem in differentiated interests and access modes. Compared with existing content caching methods, a content caching method for a satellite terrestrial integrated network with differentiated interests and access modes in an embodiment of the present disclosure includes the following steps: firstly, collecting user proportion information, content popularity distribution information, cache capacity information, and link delay information in the satellite terrestrial integrated network; then, determining a content caching problem of the collaboration of base stations and a satellite for a delay optimization based on differentiated user interests and differentiated access modes, and solving the content caching problem to obtain a content caching strategy of the collaboration of base stations and a satellite; and finally, caching, based on the obtained content caching strategy, contents in the base stations and the satellite to provide a content service for the base station access users and the satellite access users in the satellite terrestrial integrated network to optimize content service capability of the satellite terrestrial integrated network. The specific process is shown in FIG. 1. The method can reduce content service delays of base station access users and satellite access users under differentiated user interest distribution, alleviating a problem of long communication delay caused by a long transmission distance of a satellite terrestrial link, and improving user experience to support various delay sensitive services.

The above content provides a brief introduction to the content caching method for the satellite terrestrial integrated network in the differentiated interest and access mode. The specific content involved is described in detail below.

S100, user proportion information, content popularity distribution information, cache capacity information, and link delay information in the satellite terrestrial integrated network are collected.

Figure 2:
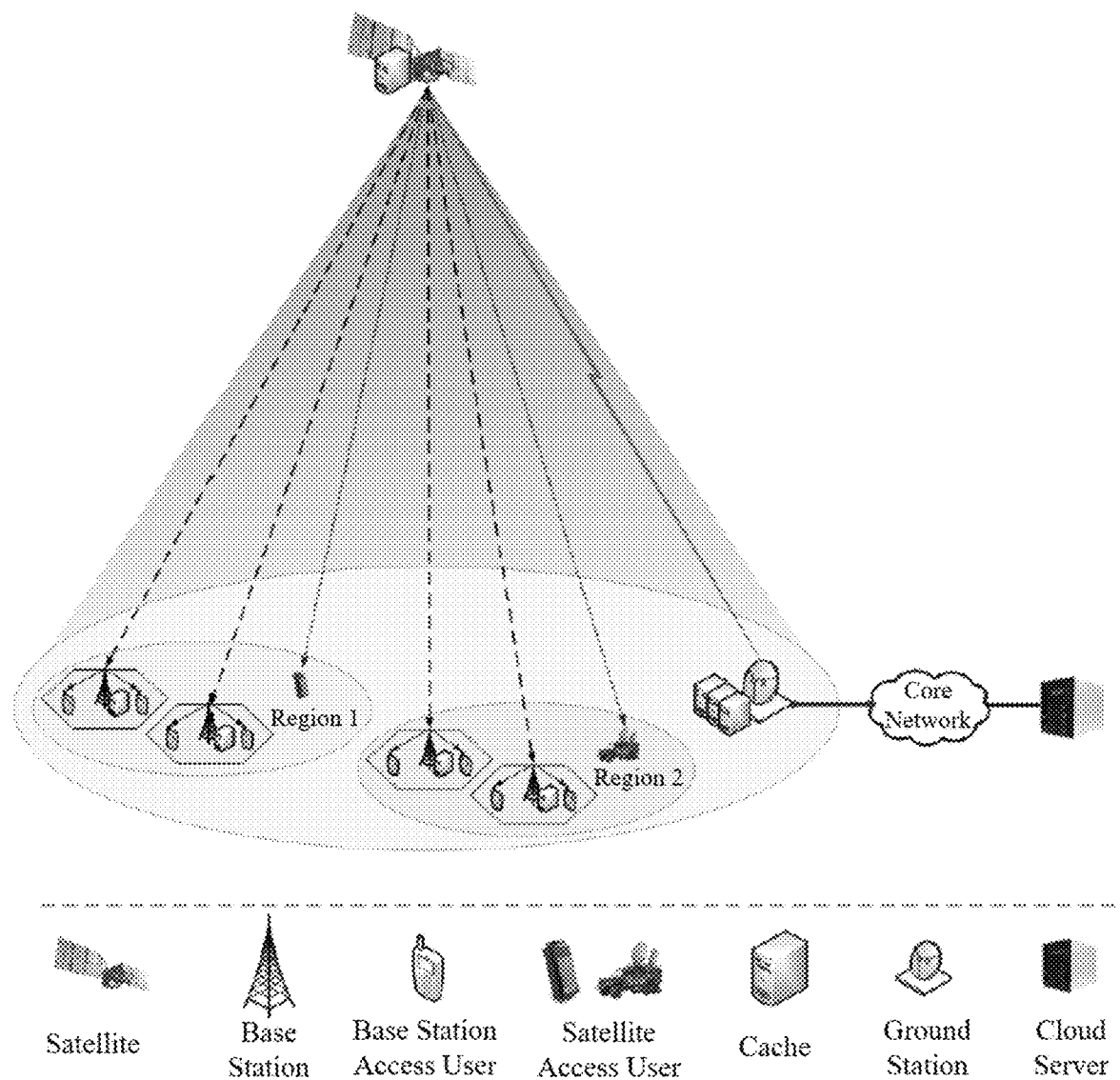
FIG. 2 is a schematic diagram of a satellite terrestrial integrated network according to an embodiment of the present disclosure.

In an alternative embodiment, referring to FIG. 2, the satellite terrestrial integrated network includes:

base stations, a satellite, base station access users, satellite access users, a ground station, and a cloud server.

There is a communication link between the base stations and the base station access users in the coverage area, there is a communication link between the satellite and the base stations in the coverage area, there is a communication link between the satellite and the satellite access users in the coverage area, there is a communication link between the ground station and the satellite, and there is a communication link between the cloud server and the ground station.

Some contents possibly requested by users is cached in the base stations, the satellite and the ground station, while all contents possibly requested by users is stored in the cloud server. The cached contents are transmitted by the base stations to the base station access users in the coverage area. The cached contents are transmitted by the satellite to the base station access users and the satellite access users in the coverage area. The cached contents are transmitted by the ground station to the satellite. The stored contents are transmitted by the cloud server to the ground station.

When a content is requested by the base station access users, the base station access users may directly obtain the content from the base stations, or obtain the content from the satellite, the ground station, and the cloud server through forwarding. When a content is requested by the satellite access user, the satellite access users may directly obtain the content from the satellite, or obtain the content from the ground station and the cloud server through forwarding.

Figure 3:
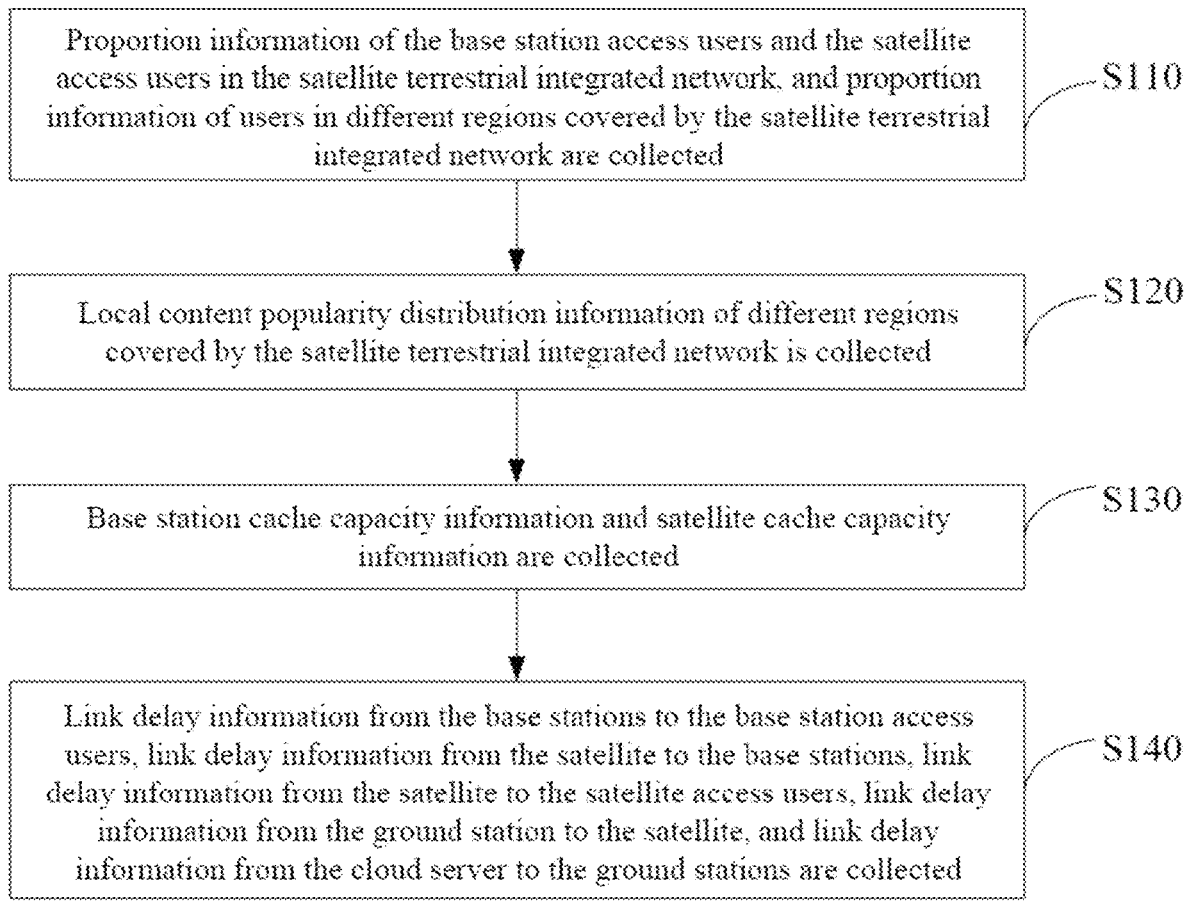
FIG. 3 is a flowchart for collecting user proportion information, content popularity distribution information, cache capacity information, and link delay information in the satellite terrestrial integrated network according to an embodiment of the present disclosure.

Optionally, referring to FIG. 3, collecting user proportion information, content popularity distribution information, cache capacity information, and link delay information in the satellite terrestrial integrated network includes:

S110, proportion information of the base station access users and the satellite access users in the satellite terrestrial integrated network, and proportion information of users in different regions covered by the satellite terrestrial integrated network are collected.

The proportion of the base station access users in the satellite terrestrial integrated network is α, and the proportion of the satellite access users is 1−α.

A coverage area of the satellite terrestrial integrated network is divided into N regions, and a proportion of users in region n is $\beta^n$, and the following relationship is satisfied:

$$\sum_{n=1}^{N} \beta^n = 1.$$

S120, local content popularity distribution information of different regions covered by the satellite terrestrial integrated network is collected.

A content set possibly cached in the base stations, the satellite, and the ground station in the satellite terrestrial integrated network is $F=\{f_1, f_2, \ldots, f_F\}$, with a total of F, and a normalized size of 1 for each content. Only part of the content set F is cached in the base stations and the satellite, while all contents in the content set are cached in the ground station.

A content set $F^c$ is cached in the base stations, the satellite, and the ground station in the satellite terrestrial integrated network, and the content set $F^c$ is only stored on the cloud server.

In the N regions covered by the satellite terrestrial integrated network, the content popularity distribution varies in different regions. For region n, the content popularity distribution is $P^n=\{p_1^n, p_2^n, \ldots, p_F^n, p_{F^c}^n\}$, and $I^n(k)=i$ represents the content with a content popularity ranking of k in region n as $f_i$.

S130, the cache capacity information of the base stations and the cache capacity information of the satellite are collected.

The base station cache capacity is $C^b<F$. $x_i^{b,n}\in\{0,1\}$ represents the content caching strategy of the base stations in region n, and $x_i^{b,n}=1$ represents the content $f_i$ cached in the base stations in region n.

The satellite cache capacity is $C^s<F$. $x_i^s\in\{0,1\}$ represents the content caching strategy of the satellite, and $x_i^s=1$ represents the content $f_i$ cached in the satellite.

S140, the link delay information from the base stations to the base station access users, the link delay information from the satellite to the base stations, the link delay information from the satellite to the satellite access user, the link delay information from the ground station to the satellite, and the link delay information from the cloud server to the ground station are collected.

The link delay from the base stations to the base station access users is $\tau_1$, the link delay from the satellite to the base stations is $\tau_2^b$, the link delay from the satellite to the satellite access users is $\tau_2^{u_s}$, the link delay from the ground station to the satellite is $\tau_3$, and the link delay from the cloud server to the ground station is $\tau_4$.

S200, a content caching problem of the collaboration of base stations and a satellite for a delay optimization is determined based on differentiated user interests and differentiated access modes.

The differentiated user interest refers to the different content popularity distribution in different regions in the satellite terrestrial integrated network, and the differentiated access mode refers to that the base station access users and the satellite access users exist in the satellite terrestrial integrated network at the same time. The delay optimization refers to minimizing the average content retrieval delays of all users in the satellite terrestrial integrated network.

Figure 4:
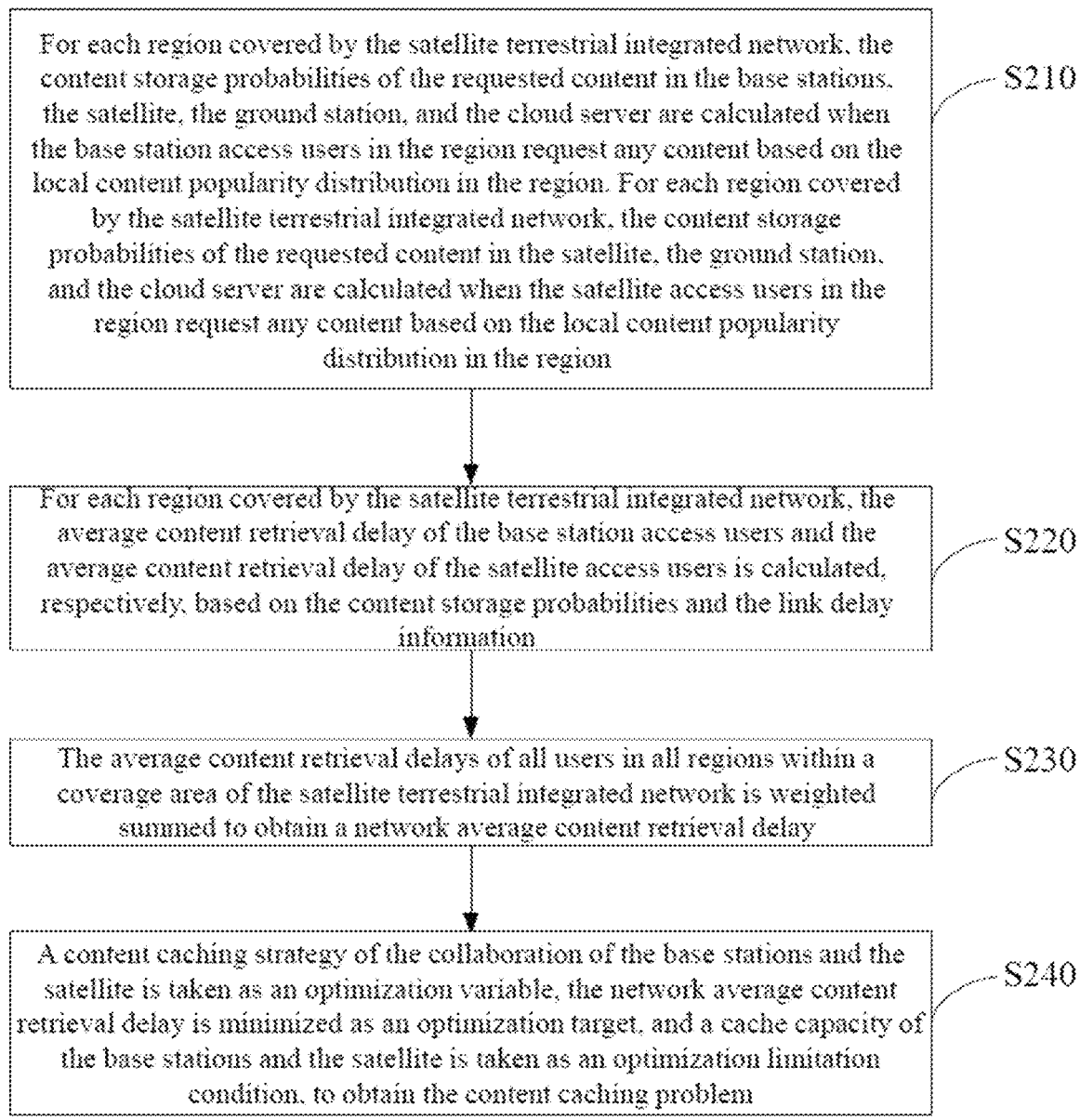
FIG. 4 shows a flowchart for determining a content caching problem of the collaboration of base stations and a satellite for a delay optimization based on differentiated user interests and differentiated access modes according to an embodiment of the present disclosure.

Optionally, referring to FIG. 4, a content caching problem of the collaboration of base stations and a satellite for a delay optimization is determined based on differentiated user interests and differentiated access modes, including:

S210, for each region covered by the satellite terrestrial integrated network, the content storage probabilities of the requested content in the base stations, the satellite, the ground station, and the cloud server are calculated when the base station access users in the region request any content based on the local content popularity distribution in the region. For each region covered by the satellite terrestrial integrated network, the content storage probabilities of the requested content in the satellite, the ground station, and the cloud server are calculated when the satellite access users in the region request any content based on the local content popularity distribution in the region.

For the base station access users in the region n, when any content is requested:

The content storage probability in the base stations when the content is retrieved is $$p_{hit,b}^{u_b,n} = \sum_{i=1}^{F} x_i^{b,n} p_i^n.$$

The content storage probability in the satellite when the content is retrieved is $$p_{hit,s}^{u_b,n} = \sum_{i=1}^{F} (1 - x_i^{b,n}) x_i^s p_i^n.$$

The content storage probability in the ground station when the content is retrieved is $$p_{hit,g}^{u_b,n} = \sum_{i=1}^{F} (1 - x_i^{b,n})(1 - x_i^s) p_i^n.$$

The content storage probability in the cloud server when the content is retrieved is $p_{hit,c}^{u_b,n} = p_{F^c}^n$.

For the satellite access users in the region n, when any content is requested:

The content storage probability in the satellite when the content is retrieved is $$p_{hit,s}^{u_s,n} = \sum_{i=1}^{F} x_i^s p_i^n.$$

The content storage probability in the ground station when the content is retrieved is $$p_{hit,g}^{u_s,n} = \sum_{i=1}^{F} (1 - x_i^s) p_i^n.$$

The content storage probability in the cloud server when the content is retrieved is $p_{hit,c}^{u_s,n} = p_{F^c}^n$ S220, for each region covered by the satellite terrestrial integrated network, the average content retrieval delay of the base station access users and the average content retrieval delay of the satellite access users is calculated, respectively, based on the content storage probabilities and the link delay information.

For the region n:

the average content retrieval delay of the base station access users is:

$$t_{ave}^{u_b,n} = p_{hit,b}^{u_b,n} \tau_1 + p_{hit,s}^{u_b,n}(\tau_1 + \tau_2^b) + p_{hit,g}^{u_b,n}(\tau_1 + \tau_2^b + \tau_3) + p_{hit,c}^{u_b,n}(\tau_1 + \tau_2^b + \tau_3 + \tau_4);$$

the average content retrieval delay of the satellite access users is:

$$t_{ave}^{u_s,n} = p_{hit,s}^{u_s,n} \tau_2^{u_s} + p_{hit,g}^{u_s,n}(\tau_2^{u_s} + \tau_3) + p_{hit,c}^{u_s,n}(\tau_2^{u_s} + \tau_3 + \tau_4).$$

S230, the average content retrieval delays of all users in all regions within a coverage area of the satellite terrestrial integrated network is weighted summed to obtain a network average content retrieval delay.

The network average content retrieval delay is $$t_{ave}^{total} = \alpha \sum_{n=1}^{N} \beta^n t_{ave}^{u_b,n} + (1-\alpha) \sum_{n=1}^{N} \beta^n t_{ave}^{u_s,n}.$$

S240, a content caching strategy of the collaboration of the base stations and the satellite is taken as an optimization variable, the network average content retrieval delay is minimized as an optimization target, and a cache capacity of the base stations and the satellite is taken as an optimization limitation condition, to obtain the content caching problem.

The content caching problem is:

$$\min_{x^b, x^s} t_{ave}^{total}$$

s.t.

$$x_i^{b,n}, x_i^s \in \{0, 1\}, \forall i \in [1, F], n \in [1, N],$$

$$\sum_{i=1}^{F} x_i^{b,n} \leq C^b, \forall n \in [1, N],$$

$$\sum_{i=1}^{F} x_i^s \leq C^s.$$

where the optimization variable is $x^b = [x^{b,1}, \ldots, x^{b,N}]$, $x^{b,n} = [x_1^{b,n}, \ldots, x_F^{b,n}]$, $x^s = [x_1^s, \ldots, x_F^s]$.

S300, the content caching problem is solved to obtain a content caching strategy of the collaboration of the base stations and the satellite.

Figure 5:
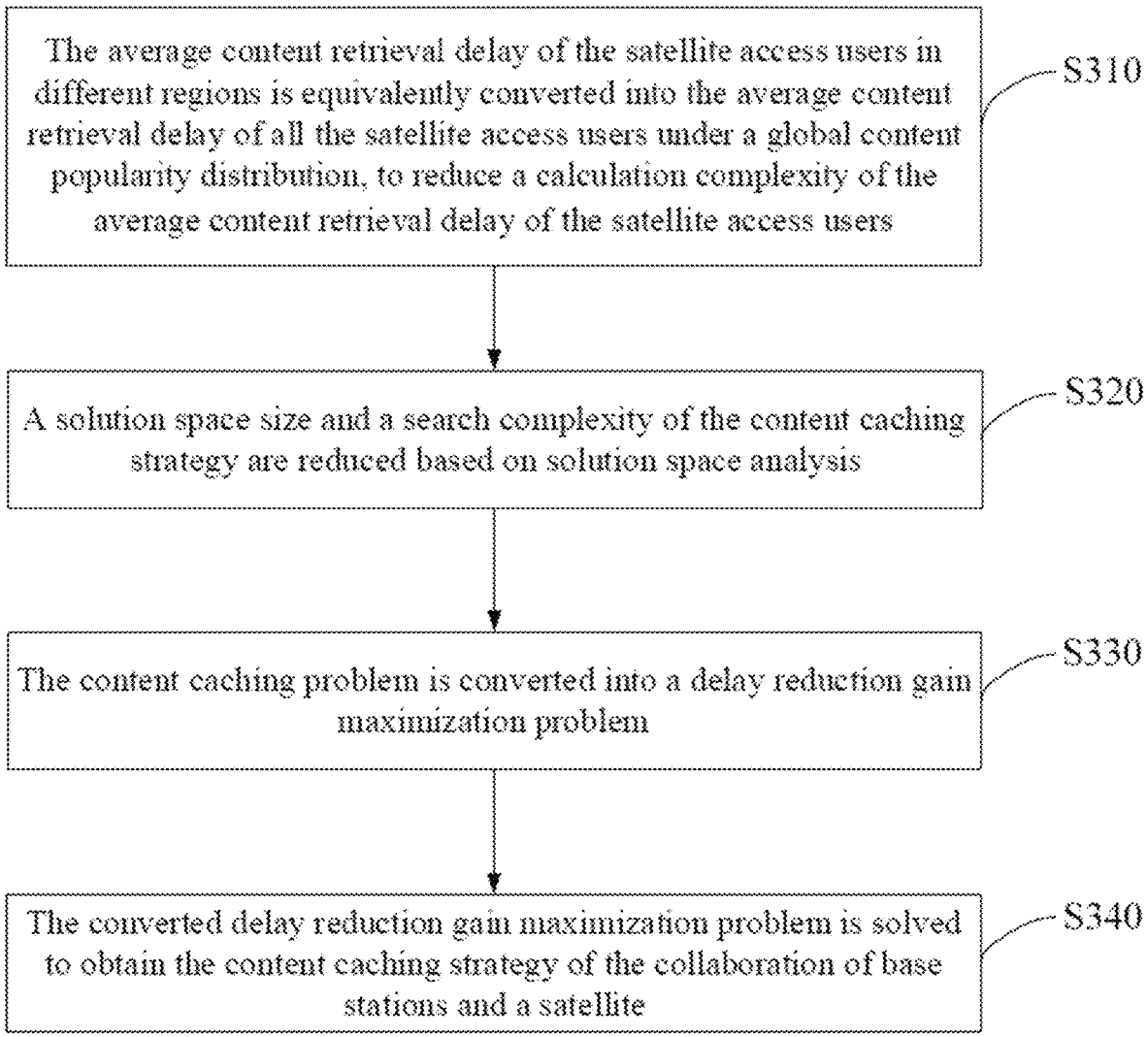
FIG. 5 shows a flowchart for solving the content caching problem to obtain a content caching strategy of the collaboration of base stations and a satellite according to an embodiment of the present disclosure.

Optionally, referring to FIG. 5, the content caching problem is solved to obtain a content caching strategy of the collaboration of the base stations and the satellite, including:

S310, the average content retrieval delay of the satellite access users in different regions is equivalently converted into the average content retrieval delay of all the satellite access users under a global content popularity distribution, to reduce calculation complexity of the average content retrieval delay of the satellite access users.

In the satellite terrestrial integrated network, the global content popularity distribution can be expressed as:

$$\overline{P} = \{\overline{p}_1, \overline{p}_2, \ldots, \overline{p}_F, \overline{p}_{F^c}\}, \overline{p}_i = \sum_{n=1}^{N} \beta^n p_i^n, \overline{p}_{F^c} = \sum_{n=1}^{N} \beta^n p_{F^c}^n.$$

$\bar{I}(k)=i$ represents the content with a global content popularity ranking of k as $f_i$.

The average content retrieval delay of all the satellite access users can be simplified as:

$$t_{ave}^{u_s} = \left[\sum_{i=1}^{F} x_i^s \overline{p}_i\right] \tau_2^{u_s} + \left[\sum_{i=1}^{F} (1-x_i^s)\overline{p}_i\right](\tau_2^{u_s}+\tau_3) + \overline{p}_{F^c}(\tau_2^{u_s}+\tau_3+\tau_4).$$

The network average content retrieval delay can be simplified as:

$$t_{ave}^{total} = \alpha \sum_{n=1}^{N} \beta^n t_{ave}^{u_b,n} + (1-\alpha) t_{ave}^{u_s}.$$

S320, a solution space size and search complexity of the content caching strategy are reduced based on solution space analysis.

The solution space of the content caching strategy of the base stations and the satellite is performed optimal solution analysis, obtaining the possible set of cached content when the optimal solution is reached, thereby reducing a solution space size, and reducing search complexity of the content caching strategy based on solution space analysis.

Optionally, referring to FIG. 6, a solution space size and search complexity of the content caching strategy are reduced based on solution space analysis, including:

S321, for each region, fixedly cached contents and selectively cached contents of the base stations in the region are calculated based on local content popularity distribution information, the cache capacity information and the link delay information in the region. In addition, fixedly cached contents and selectively cached contents of the satellite are calculated based on the user proportion information, global content popularity distribution information, and the cache capacity information.

For the region n, a set of the fixedly cached contents set of the base stations in the region is:

$$F_{fix}^{b,n} = \{f_{I^n(1)}, f_{I^n(2)}, \ldots, f_{I^n(k_{fix}^{b,n})}\};$$

$$k_{fix}^{b,n} = \max\{k \mid p_{I^n(k)}^n \tau_2^b \geq p_{I^n(C^b+1)}^n(\tau_2^b+\tau_3)\}.$$

The fixedly cached contents refer to content necessarily cached in the content caching strategy of the base stations.

For the region n, a set of the selectively cached contents of the base stations in the region is:

$$F_{sel}^{b,n} = \{f_{I^n(k_{fix}^{b,n}+1)}, f_{I^n(k_{fix}^{b,n}+2)}, \ldots, f_{I^n(k_{max}^{b,n})}\};$$

$$k_{max}^{b,n} = \min\left\{C^b+C^s, \max\left\{k \mid p_{I^n(k)}^n \geq \frac{\tau_2^b}{\tau_2^b+\tau_3}p_{I^n(C^b)}^n\right\}\right\}.$$

The selectively cached contents refer to content possibly cached in the content caching strategy of the base stations. Except for the fixedly cached contents and the selectively cached contents, all other content will not be cached.

A set of the fixedly cached contents of the satellite is:

$$F_{fix}^s = \{f_{\bar{I}(1)}, f_{\bar{I}(2)}, \ldots, f_{\bar{I}(k_{fix}^s)}\};$$

$$k_{fix}^s = \max\left\{k \mid \overline{p}_{\bar{I}(k_1)} \geq \frac{1}{(1-\alpha)}\overline{p}_{\bar{I}(C^s+1)}\right\}.$$

The fixedly cached contents refer to content necessarily cached in the content caching strategy of the satellite.

A set of the selectively cached contents of the satellite is:

$$F_{sel}^s = \{f_{\bar{I}(k_{fix}^s+1)}, f_{\bar{I}(k_{fix}^s+2)}, \ldots, f_{\bar{I}(k_{max}^s)}\};$$

$$k_{max}^s = \max\{k \mid \overline{p}_{\bar{I}(k)} \geq (1-\alpha)\overline{p}_{\bar{I}(C^s)}\}.$$

The selectively cached contents refer to content possibly cached in the content caching strategy of the satellite. Except for the fixedly cached contents and the selectively cached contents, all other content will not be cached.

S322, for each region, a solution space of the content caching strategy of the base stations in the region is reduced to a union set of the fixedly cached contents and the selectively cached contents of the base stations in the region, and a search space of the content caching strategy of the base stations in the region is reduced to a set of the selectively cached contents of the base stations in the region. In addition, a solution space of the content caching strategy of the satellite is reduced to a union set of the fixedly cached contents and the selectively cached contents of the satellite, and a search space of the content caching strategy of the satellite is reduced to the set of the selectively cached contents of the satellite.

Optionally, for the region n, the solution space of the content caching strategy of the base stations in the region is reduced to $F_{fix}^{b,n} \cup F_{sel}^{b,n}$.

For the region n, the search space of the content caching strategy of the base stations is reduced to $F_{sel}^{b,n}$. As the set of the fixedly cached contents are always cached, only the remaining cache content needs to be searched in the set of the selectively cached contents.

Optionally, the solution space of the content caching strategy of the satellite is reduced to $F_{fix}^s \cup F_{sel}^s$.

The search space of the content caching strategy of the satellite is reduced to $F_{sel}^s$. As the set of the fixedly cached contents are always cached, only the remaining cache content needs to be searched in the set of the selectively cached contents.

S330, the content caching problem is converted into a delay reduction gain maximization problem.

When $t_0$ represents the average content retrieval delay of users when the base stations and the satellite do not cache any content, and $t_{ave}^{total}(x^b, x^s)$ represents the average content retrieval delay of users when the content caching strategies of the base stations and the satellite is $x^b$, $x^s$, then $\Gamma(x^b, x^s)$ represents the delay reduction gain brought by the content caching strategies $x^b$, $x^s$, calculated as $\Gamma(x^b, x^s) = t_{ave}^{total}(x^b, x^s) - t_0$.

The content caching problem is converted into a delay reduction gain maximization problem as followed:

$$\min_{x^b, x^s} \Gamma(x^b, x^s)$$

s.t.

$$x_i^{b,n}, x_i^s \in \{0, 1\}, \forall i \in [1, F], n \in [1, N],$$

$$\sum_{i=1}^{F} x_i^{b,n} \leq C^b, \forall n \in [1, N],$$

$$\sum_{i=1}^{F} x_i^s \leq C^s$$

S340, the converted delay reduction gain maximization problem is solved to obtain the content caching strategy of the collaboration of base stations and a satellite.

Figure 7:
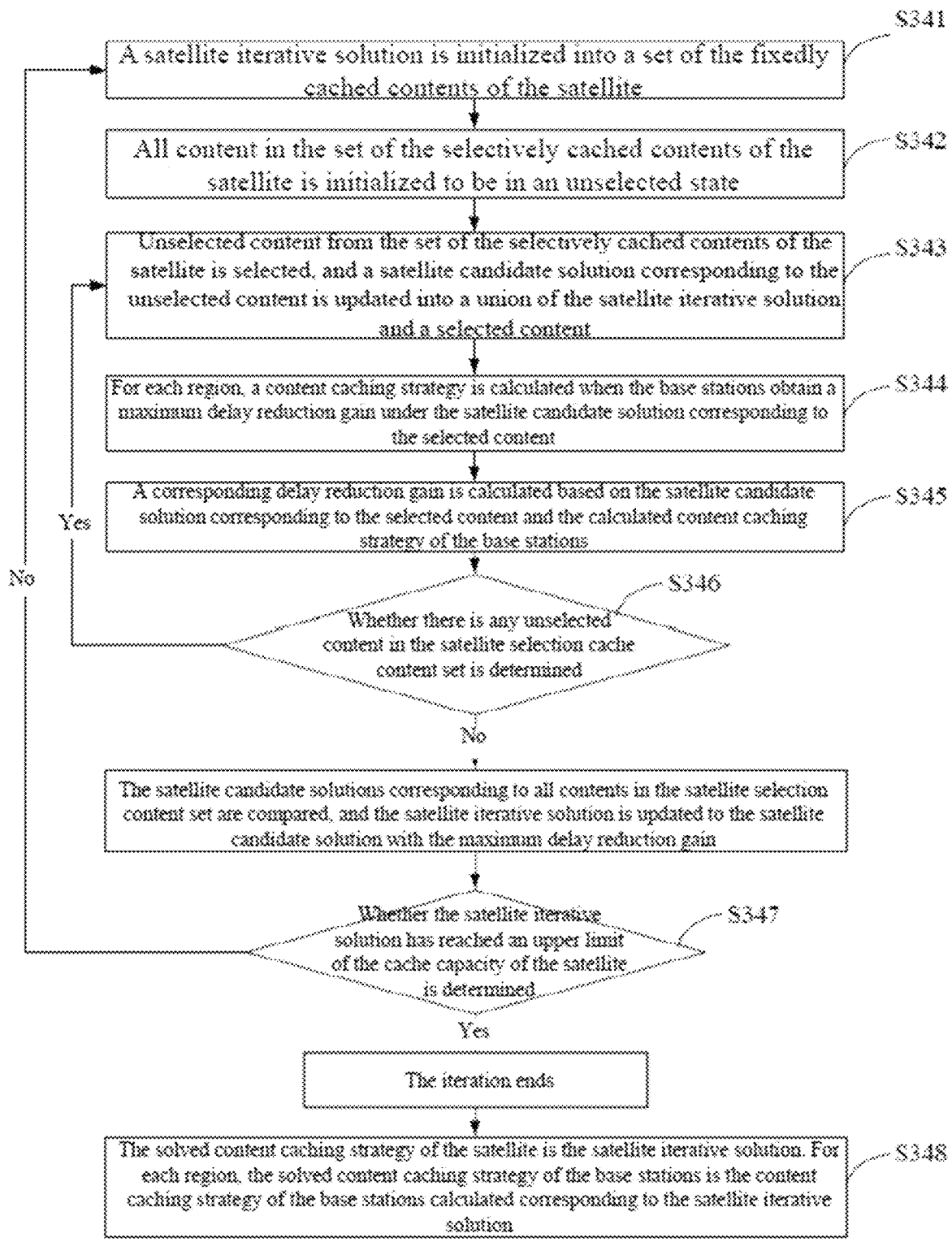
FIG. 7 shows a flowchart for solving the converted delay reduction gain maximization problem to obtain the content caching strategy of the collaboration of base stations and a satellite according to an embodiment of the present disclosure.

Optionally, referring to FIG. 7, the converted delay reduction gain maximization problem is solved to obtain the content caching strategy of the collaboration of base stations and a satellite, including:

performing the following iterative sub-steps:

S341, a satellite iterative solution is initialized into the set of the fixedly cached contents of the satellite.

$l = k_{fix}^s$ is initialized, where l represents the currently used capacity of the satellite cache, and the satellite iteration solution $A_l$ is initialized to $A_l = F_{fix}^s$.

S342, all content in the set of the selectively cached contents of the satellite is initialized to be in an unselected state.

$\{flag_{\bar{l}(k_{fix}^s+1)}, flag_{\bar{l}(k_{fix}^s+2)}, \ldots, flag_{\bar{l}(k_{max}^s)}\} = \{0, 0, \ldots, 0\}$ is initialized, corresponding to all contents in the set of the selectively cached contents of the satellite, where $flag_{\bar{l}(k_{fix}^s+1)} = 0$ represents the unselected state of content $f_{\bar{l}(k_{fix}^s+1)}$ in the set of the selectively cached contents of the satellite, and $k = k_{fix}^s + 1$ is initialized.

S343, unselected content from the set of the selectively cached contents of the satellite is selected, and a satellite candidate solution corresponding to the unselected content is updated into a union of the satellite iterative solution and a selected content.

Content $f_{\bar{l}(x)}$ is selected from the set $F_{sel}^s$ of the selectively cached contents of the satellite, and $flag_{\bar{l}(k)} = 1$ is updated. The corresponding satellite candidate solution is $S_l\{f_{\bar{l}(k)}\} = A_l \cup \{f_{\bar{l}(x)}\}$ when the selected content $f_{\bar{l}(k)}$ is updated.

S344, for each region, a content caching strategy is calculated when the base stations obtains a maximum delay reduction gain under the satellite candidate solution corresponding to the selected content.

For each region, the content caching strategy $B_l^{b,n}(f_{\bar{l}(k)})$ is calculated when the satellite content caching strategy is $S_l(f_{\bar{l}(k)})$ and the base stations in the region achieves the maximum delay reduction gain.

Figure 8:
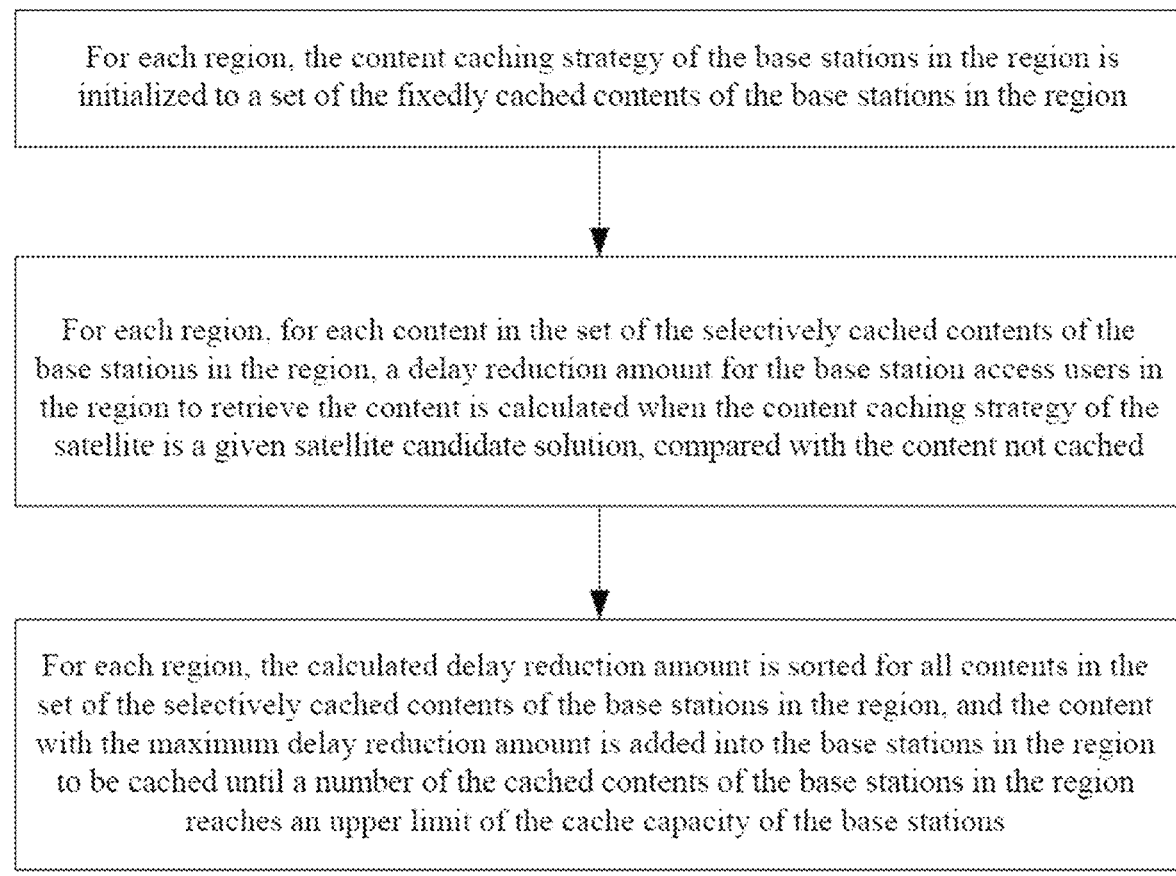
FIG. 8 shows a flowchart for calculating, for each region, a content caching strategy when the base stations obtains a maximum delay reduction gain under the satellite candidate solution corresponding to the selected content according to an embodiment of the present disclosure.

Optionally, referring to FIG. 8, for each region, a content caching strategy is calculated when the base stations obtains a maximum delay reduction gain under the satellite candidate solution corresponding to the selected content, including:

(1) For each region, the content caching strategy of the base stations in the region is initialized to a set of the fixedly cached contents of the base stations in the region.

For each region, the content caching strategy of the base stations in the region is initialized to $B_l^{b,n}(f_{\bar{l}(k)}) = F_{fix}^{b,n}$.

(2) For each region, for each content in the set of the selectively cached contents of the base stations in the region, a delay reduction amount for the base station access users in the region to retrieve the content is calculated when the content caching strategy of the satellite is a given satellite candidate solution in a case where the base stations cache the content as compared with a case where the base stations do not Optionally, for each region, for each content $f_i \in F_{sel}^{b,n}$ in the set of the selectively cached contents of the base stations in the region, a delay reduction amount $\Delta t_i^{b,n}$ for the base station access users in the region to retrieve the content $f_i$ is calculated when the content caching strategy of the satellite is a given satellite candidate solution $S_l(f_{\bar{l}(k)})$ in a case where the base stations cache the content $f_i$ as compared with a case where the base stations do not, and the delay reduction amount $\Delta t_i^{b,n}$ calculated as follows:

$$\Delta t_i^{b,n} = \begin{cases} p_i^n(\tau_2^b + \tau_3), & x_i^s = 0, \\ p_i^n \tau_2^b, & x_i^s = 1. \end{cases}$$

where when $f_i \in S_l(f_{\bar{l}(k)})$, $x_i^s = 1$; and when $f_i \notin S_l(f_{\bar{l}(k)})$, $x_i^s = 0$.

(3) For each region, the calculated delay reduction amount is sorted for all contents in the set of the selectively cached contents of the base stations in the region, and the content with the maximum delay reduction amount is added into the base stations in the region to be cached until a number of the cached contents of the base stations in the region reaches an upper limit of the cache capacity of the base stations.

Optionally, for each region, the calculated delay reduction amount $\Delta t_i^{b,n}$ is sorted for all contents in the set $F_{sel}^{b,n}$ of the selectively cached contents of the base stations in the region. $\theta^n(k) = i$ indicates that the content with delay reduction sorted as k is $f_i$ in the set of the selectively cached contents of the base stations in the region n.

For each region, the content caching strategy for the base stations in the region is as follows:

$$B_l^{b,n}(f_{\bar{l}(k)}) = F_{fix}^{b,n} \cup \{f_{\theta^n(1)}, f_{\theta^n(2)}, \ldots, f_{\theta^n(C^b - k_{fix}^{b,n})}\}.$$

S345, a corresponding delay reduction gain is calculated based on the satellite candidate solution corresponding to the selected content and the calculated content caching strategy of the base stations.

For the satellite candidate solution $S_l(f_{\bar{l}(k)})$ corresponding to the selected content, for each content $f_i \notin S_l(f_{\bar{l}(k)})$ in $S_l(f_{\bar{l}(k)})$, $x_i^s = 1$ is defined, and for each content $f_i \in S_l(f_{\bar{l}(k)})$ that does not belong to $S_l(f_{\bar{l}(k)})$, $x_j^s = 0$ is defined, to obtain the content caching strategy $x^s$ of the satellite.

For each calculated content caching strategy $B_l^{b,n}(f_{\bar{l}(k)})$ of the base stations in the region, for each content $f_i \in B_l^{b,n}(f_{\bar{l}(k)})$ in $B_l^{b,n}(f_{\bar{l}(k)})$, $x_i^{b,n} = 1$ is defined, and for each content $f_j \in B_l^{b,n}(f_{\gamma(k)})$ that does not belong to $B_l^{b,n}(f_{\gamma(k)})$, $x_j^{b,n}=0$ is defined, to obtain the content caching strategy $x^b$ of the base stations.

The delay reduction gain $\Gamma(f_{\gamma(k)})=\Gamma(x_b,x^s)$ is calculated based on the obtained $x^s, x^b$.

S346, whether there is any unselected content in the satellite selection cache content set is determined. Based on the value k, whether there is any unselected content in the set of the selectively cached contents of the satellite is determined. If there is unselected content in the set of the selectively cached contents of the satellite, return to continue selecting the remaining content. If there is no unselected content in the set of the selectively cached contents of the satellite, the satellite candidate solutions corresponding to all contents in the satellite selection content set are compared, and the satellite iterative solution is updated to the satellite candidate solution with the maximum delay reduction gain.

Optionally, if $k<k_{max}^s$, there is unselected content. $k=k+1$ is updated and S343 is returned to continue selecting the remaining content.

If $k=k_{max}^s$, there is no unselected content. The satellite candidate solutions corresponding to all contents in the satellite selection content set are compared. $\Gamma(f_{\gamma(k^*)})$ is defined to be the maximum value in $\{\Gamma(f_{\gamma(k_{fix}^s+1)}), \Gamma(f_{\gamma(k_{fix}^s+2)}), \ldots, \Gamma(f_{\gamma(k_{max}^s)})\}$, and the satellite iteration solution is updated to $A_{l+1}=A_l \cup \{f_{\gamma(k^*)}\}$.

S347, when there is no unselected content, whether the satellite iterative solution has reached an upper limit of the cache capacity of the satellite is continued to determine. Based on the value l, whether the satellite iteration solution has reached the upper limit of the cache capacity of the satellite is determined. If the satellite iterative solution does not reach the upper limit of the cache capacity of the satellite, return to continue iteration. If the satellite iterative solution has reached the upper limit of the cache capacity of the satellite, the iteration ends.

Optionally, if $l+1<C^s$, the upper limit is not reached, $l=l+1$ is updated and S342 is returned to continue iteration. If $(+1=C'$, the upper limit is reached and the iteration ends.

S348, the solved content caching strategy of the satellite is the satellite iterative solution. For each region, the solved content caching strategy of the base stations is the content caching strategy of the base stations calculated corresponding to the satellite iterative solution.

The solved content caching strategy of the satellite is the satellite iterative solution $A_{C^s}$. For each region, the solved content caching strategy of the base stations is the content caching strategy of the base stations calculated in the step S344 corresponding to the satellite iterative solution. The values $x^s$, $x^b$ for the corresponding variable can be obtained based on the method in step S345, and will not be repeated here.

S400, based on the obtained content caching strategy, contents are cached in the base stations and the satellite to provide a content service for the base station access users and the satellite access users in the satellite terrestrial integrated network.

According to the content caching method for the satellite terrestrial integrated network under the differentiated interest and access mode provided by the present disclosure, edge content services are provided to both the base station access users and the satellite access users under the differentiated user interest distribution by collaborative caching between the base stations and the satellite. The calculation complexity of the average content retrieval delay of the satellite access users and the search complexity of the content caching strategy are reduced based on the global content popularity and the solution space analysis, and the content caching problem is converted into the delay reduction gain maximization problem. Finally, the content caching strategy of the collaboration of the base stations and a satellite with a minimum average content retrieval delay is solved.

Figure 9:
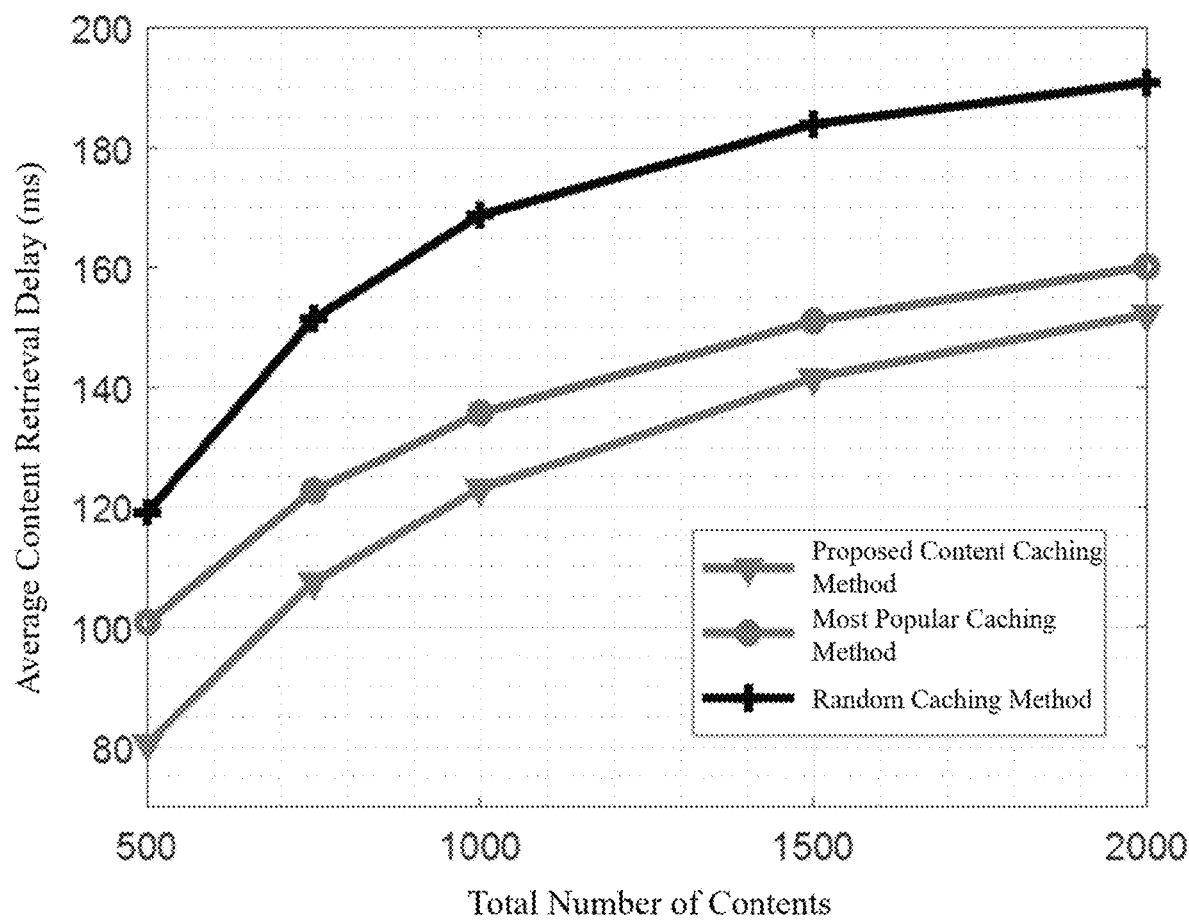
FIG. 9 is a schematic diagram of the performance comparison of content caching method for a satellite terrestrial integrated network with differentiated interests and access modes according to an embodiment of the present disclosure.

The schematic diagram of the satellite terrestrial integrated network in this embodiment is shown in FIG. 2, where the proportion of base station access users is 0.9, the proportion of satellite access users is 0.1, the number of regions is 3, the proportion of users in each region is ⅓, the number of content that users may request is 500-2000, the cache capacity of the base stations is 200, the cache capacity of the satellite is 200, the link delay from the base stations to the base station access users is 20 ms, the link delay from the satellite to the base stations is 100 ms, the link delay from the satellite to the satellite access users is 100 ms, the link delay from the ground station to the satellite is 100 ms, and the link delay from the cloud server to the ground station is 500 ms. The local content popularity distribution of each region adopts a zipf distribution with a factor of 0.5. Referring to FIG. 9, it can be seen that under the differentiated user interest distribution and the differentiated access mode, the content caching method proposed in this embodiment can reduce the average content retrieval delay by 30% compared to the random caching method, and by 20% compared to the most popular caching method. The content caching method for the satellite terrestrial integrated network under the differentiated interest and access mode in the present disclosure can effectively reduce the content retrieval delay of the base station access users and the satellite access users in the satellite terrestrial integrated network, alleviating the problem of long communication delay caused by a long transmission distance of a satellite terrestrial link, and improving user experience to support various delay sensitive services.

A computer program product of the content caching method for the satellite terrestrial integrated network under the differentiated interest and access mode provided in the embodiments of the present disclosure includes a computer-readable storage medium storing a program, and an instruction included in the program can be configured to implement the method described in the previous embodiments. The specific implementation can be found in the method embodiments, and details are not described herein again.

Those skilled in the art may clearly understand that, for conciseness and clarity of description, a specific working process of the system and the apparatus described above can refer to a corresponding process in the foregoing method embodiments, and details are not described herein again.

The functions, if implemented in the form of software functional units and sold or used as independent products, may be stored in a computer-readable storage medium. Based on such understanding, the technical solution of the present disclosure essentially or a part contributing to the prior art or a part of the technical solution may be embodied in a form of a software product. The computer software product is stored in a storage medium, and includes a plurality of instructions for causing a computer device, which may be a personal computer, a server, or a network device, to perform all or part of the steps of the methods in the embodiments of the present disclosure. The foregoing storage medium includes various media that can store program codes, such as a USB flash disk, a mobile hard disk, a read-only memory (ROM), a random access memory (RAM), a magnetic disk, or an optical disk.

The above description is only a preferred embodiment of the present disclosure and is not intended to limit the present disclosure, and any modifications, equivalent substitutions or improvements made within the spirit and principle of the present disclosure shall be included within the protection scope of the present disclosure.

What is claimed is:

1. A content caching method for a satellite terrestrial integrated network with differentiated interests and access modes, comprising:
   step (1), collecting user proportion information, content popularity distribution information, cache capacity information, and link delay information in the satellite terrestrial integrated network, wherein the satellite terrestrial integrated network comprises base stations, a satellite, base station access users, satellite access users, a ground station, and a cloud server; and a cover area of the satellite terrestrial integrated network is divided into multiple regions, and different regions have different local content popularity distributions;
   wherein the user proportion information comprises proportion information of the base station access users and the satellite access users in the satellite terrestrial integrated network, and proportion information of users in different regions covered by the satellite terrestrial integrated network;
   the content popularity distribution information is local content popularity distribution information of different regions covered by the satellite terrestrial integrated network;
   the cache capacity information comprises base station cache capacity information and satellite cache capacity information; and
   the link delay information comprises link delay information from the base stations to the base station access users, link delay information from the satellite to the base stations, link delay information from the satellite to the satellite access user, link delay information from the ground station to the satellite, and link delay information from the cloud server to the ground station;
   step (2), determining a content caching problem of a collaboration of the base stations and the satellite for a delay optimization based on differentiated user interests and differentiated access modes, wherein the delay optimization refers to minimizing an average content retrieval delay of all users in the satellite terrestrial integrated network; and the step (2) comprises:
   sub-step (2.1), for each region covered by the satellite terrestrial integrated network, calculating, based on a local content popularity distribution in the region, content storage probabilities of a requested content in the base stations, the satellite, the ground station, and the cloud server when the base station access users in the region request any content; and
   for each region covered by the satellite terrestrial integrated network, calculating, based on the local content popularity distribution in the region, content storage probabilities of the requested content in the satellite, the ground station, and the cloud server when the satellite access users in the region request any content;
   sub-step (2.2), for each region covered by the satellite terrestrial integrated network, calculating an average content retrieval delay of the base station access users and an average content retrieval delay of the satellite access users, respectively, based on the content storage probabilities and the link delay information;
   sub-step (2.3), performing weighted summation on the average content retrieval delays of all users in all regions within a coverage area of the satellite terrestrial integrated network to obtain a network average content retrieval delay; and
   sub-step (2.4), obtaining the content caching problem by taking a content caching strategy of the collaboration of the base stations and the satellite as an optimization variable, minimization of the network average content retrieval delay as an optimization target, and cache capacities of the base stations and the satellite as an optimization limitation condition;
   step (3), solving the content caching problem to obtain the content caching strategy of the collaboration of the base stations and the satellite;
   sub-step (3.1), equivalently converting the average content retrieval delay of the satellite access users in different regions into the average content retrieval delay of all the satellite access users under a global content popularity distribution, in such a manner to reduce a calculation complexity of the average content retrieval delay of the satellite access users;
   sub-step (3.2), reducing a solution space size and reducing a search complexity of the content caching strategy based on solution space analysis;
   sub-step (3.3), converting the content caching problem into a maximization problem of a delay reduction gain, wherein the delay reduction gain refers to a reduction amount of an average content retrieval delay of the users under a current content caching strategy when no content is cached by the base stations and the satellite; and
   sub-step (3.4), solving the converted maximization problem of the delay reduction gain to obtain the content caching strategy of the collaboration of the base stations and the satellite; and
   step (4), caching, based on the obtained content caching strategy, contents in the base stations and the satellite to provide a content service for the base station access users and the satellite access users in the satellite terrestrial integrated network.

2. The content caching method for a satellite terrestrial integrated network with differentiated interests and access modes according to claim 1, wherein the sub-step (3.2) further comprises:
   sub-step (3.2.1), for each region, calculating fixedly cached contents and selectively cached contents of the base stations in the region based on the local content popularity distribution information, the cache capacity information and the link delay information of the region, wherein the fixedly cached contents refer to contents necessarily cached in the content caching strategy obtained by solving the content caching problem, and the selectively cached contents refer to contents possibly cached in the content caching strategy obtained by solving the content caching problem; and
   calculating fixedly cached contents and selectively cached contents of the satellite based on the user proportion information, global content popularity distribution information, and the cache capacity information; and
   sub-step (3.2.2), for each region, reducing a solution space of the content caching strategy of the base stations in the region to a union set of the fixedly cached contents and the selectively cached contents of the base stations in the region, and reducing a search space of the content caching strategy of the base stations in the region to a set of the selectively cached contents of the base stations in the region; and reducing a solution space of the content caching strategy of the satellite to a union set of the fixedly cached contents and the selectively cached contents of the satellite, and reducing a search space of the content caching strategy of the satellite to a set of the selectively cached contents of the satellite.

3. The content caching method for a satellite terrestrial integrated network with differentiated interests and access modes according to claim 2, wherein the sub-step (3.4) comprises the following iterative sub-steps:

sub-step (3.4.1), initializing a satellite iterative solution into a set of the fixedly cached contents of the satellite;

sub-step (3.4.2), initializing all contents in the set of the selectively cached contents of the satellite to be in an unselected state;

sub-step (3.4.3), selecting unselected content from the set of the selectively cached contents of the satellite, and updating a satellite candidate solution corresponding to the unselected content into a union of the satellite iterative solution and selected content;

sub-step (3.4.4), calculating, for each region, a content caching strategy when the base stations obtain a maximum delay reduction gain under a satellite candidate solution corresponding to the selected content;

sub-step (3.4.5), calculating a corresponding delay reduction gain based on the satellite candidate solution corresponding to the selected content and the calculated content caching strategy of the base stations;

sub-step (3.4.6), determining whether there is unselected content in the set of the selectively cached contents of the satellite; when there is unselected content in the set of the selectively cached contents of the satellite, returning to the sub-step (3.4.3); and when there is no unselected content in the set of the selectively cached contents of the satellite, comparing satellite candidate solutions corresponding to all contents in the set of the selectively cached contents of the satellite, and updating the satellite iterative solution to a satellite candidate solution with the maximum delay reduction gain; and sub-step (3.4.7), determining whether the satellite iterative solution reaches an upper limit of the cache capacity of the satellite when there is no unselected content in the set of the selectively cached contents of the satellite; when the satellite iterative solution does not reach the upper limit of the cache capacity of the satellite, returning to the sub-step (3.4.2); when the satellite iterative solution has reached the upper limit of the cache capacity of the satellite, ending the iterative sub-steps;

wherein a solved content caching strategy of the satellite is the satellite iterative solution; for each region, a solved content caching strategy of the base stations is the content caching strategy of the base stations calculated in the sub-step (3.4.4) corresponding to the satellite iterative solution.

4. The content caching method for a satellite terrestrial integrated network with differentiated interests and access modes according to claim 3, wherein the sub-step (3.4.4) further comprises:

sub-step (3.4.4.1), for each region, initializing the content caching strategy of the base stations in the region to a set of the fixedly cached contents of the base stations in the region;

sub-step (3.4.4.2), for each region, calculating, for each content in a set of the selectively cached contents of the base stations in the region, a delay reduction amount for the base station access users in the region to retrieve the content when the content caching strategy of the satellite is a given satellite candidate solution in a case where the base stations cache the contents as compared with a case where the base stations do not; and sub-step (3.4.4.3), for each region, sorting the calculated delay reduction amounts for all contents in the set of the selectively cached contents of the base stations in the region, and adding the contents with a maximum delay reduction amount into the base stations in the region to be cached until a number of the cached contents of the base stations in the region reaches an upper limit of the cache capacity of the base stations.

* * * * *